United States Patent [19]
Babuder

[11] Patent Number: 5,145,219
[45] Date of Patent: Sep. 8, 1992

[54] TUBE COUPLING WITH GASKET RETAINER

[75] Inventor: Gerald A. Babuder, Mentor, Ohio

[73] Assignee: Cajon Company, Macedonia, Ohio

[21] Appl. No.: 561,689

[22] Filed: Aug. 1, 1990

[51] Int. Cl.$^5$ .............................................. F16L 19/00
[52] U.S. Cl. ..................................... 285/330; 285/353;
285/379; 285/386; 285/910; 277/236
[58] Field of Search ................ 285/328, 354, 379, 108,
285/910, 355, 330, 334.3, 917, 386, 341, 353;
277/236, 64, 105, 123, 207 A

[56] References Cited

U.S. PATENT DOCUMENTS

| | | | |
|---|---|---|---|
| 3,847,421 | 11/1974 | Eschbaugh et al. | 285/379 X |
| 4,552,389 | 11/1985 | Babuder et al. | 285/379 |
| 4,555,129 | 11/1985 | Davlin | 285/354 X |
| 4,586,735 | 5/1986 | Innes | 285/379 |
| 4,650,227 | 3/1987 | Babuder et al. | 285/379 |
| 4,660,868 | 4/1987 | Totani | 285/354 |
| 4,665,960 | 5/1987 | Brzezicki | 285/379 X |
| 4,674,775 | 6/1987 | Tajima et al. | 285/354 X |
| 4,685,707 | 8/1987 | Miyashita | 285/354 X |
| 4,779,903 | 10/1988 | Maier et al. | 277/207 A |
| 4,807,911 | 2/1989 | Short | 285/379 X |
| 4,838,583 | 6/1989 | Babuder et al. | 285/354 |
| 4,854,597 | 8/1989 | Leigh | 277/236 X |
| 4,867,462 | 9/1989 | Udagawa | 277/236 X |
| 4,872,712 | 10/1989 | Maier | 285/910 X |
| 4,887,852 | 12/1989 | Hancock | 285/354 X |

FOREIGN PATENT DOCUMENTS 22559 of 1899 United Kingdom ................ 285/353

Primary Examiner—Randolph A. Reese
Assistant Examiner—Timothy Aberle
Attorney, Agent, or Firm—Fay, Sharpe, Beall, Fagan, Minnich & McKee

[57] ABSTRACT

A tube coupling assembly particularly suited for ultra-high vacuum applications comprises a pair of coupling components having through passages and abutting end faces. Each end face includes an annular continuous rib or bead. A threaded coupling nut acts to drive the ribs into sealing engagement with the opposite sides of flat annular sealing washer gasket positioned between the end faces. To prevent relative rotation between the end faces and the sealing gasket, as well as to prevent torque transmission to related system components, protrusions are provided which engage the coupling components to produce a driving connection between the gasket and/or the two coupling components prior to engagement of the ribs with the gasket. Also, a resinous plastic bearing washer is used between the coupling nut and the associated coupling component to reduce torque transmission during make-up.

18 Claims, 3 Drawing Sheets

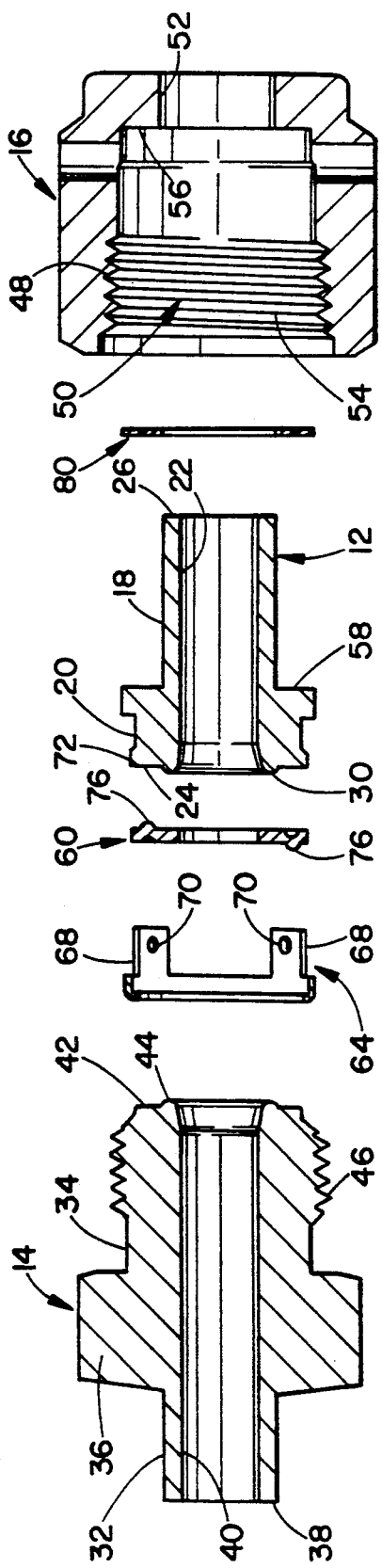
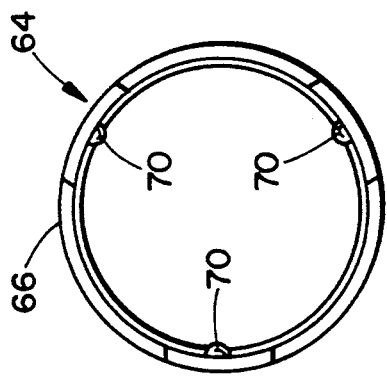
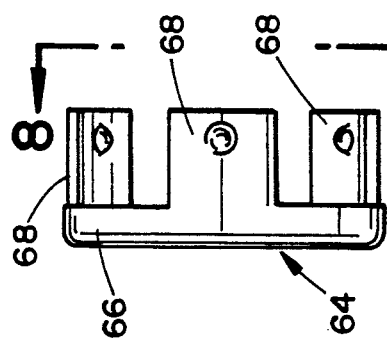
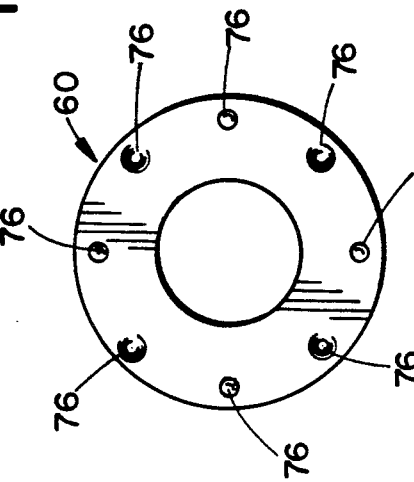

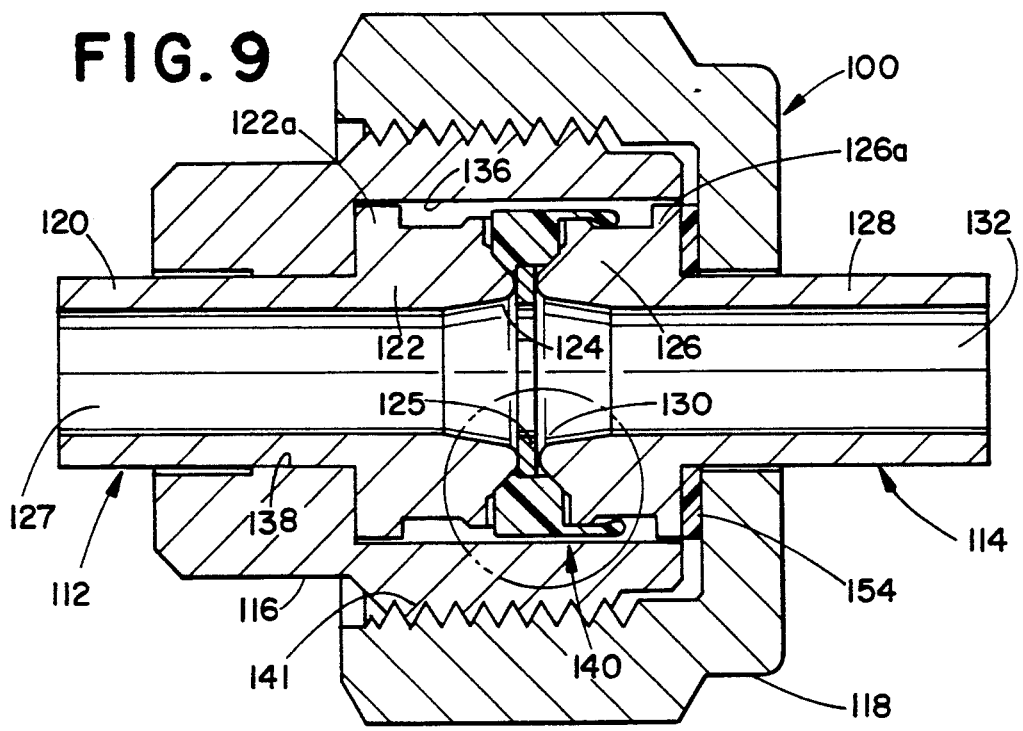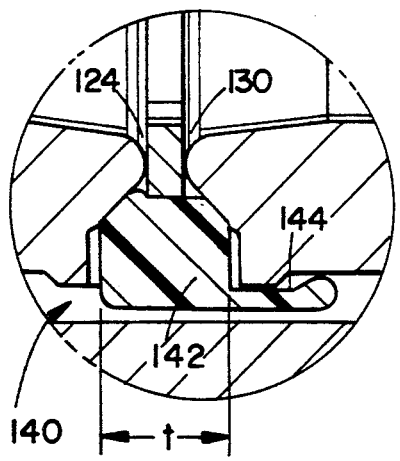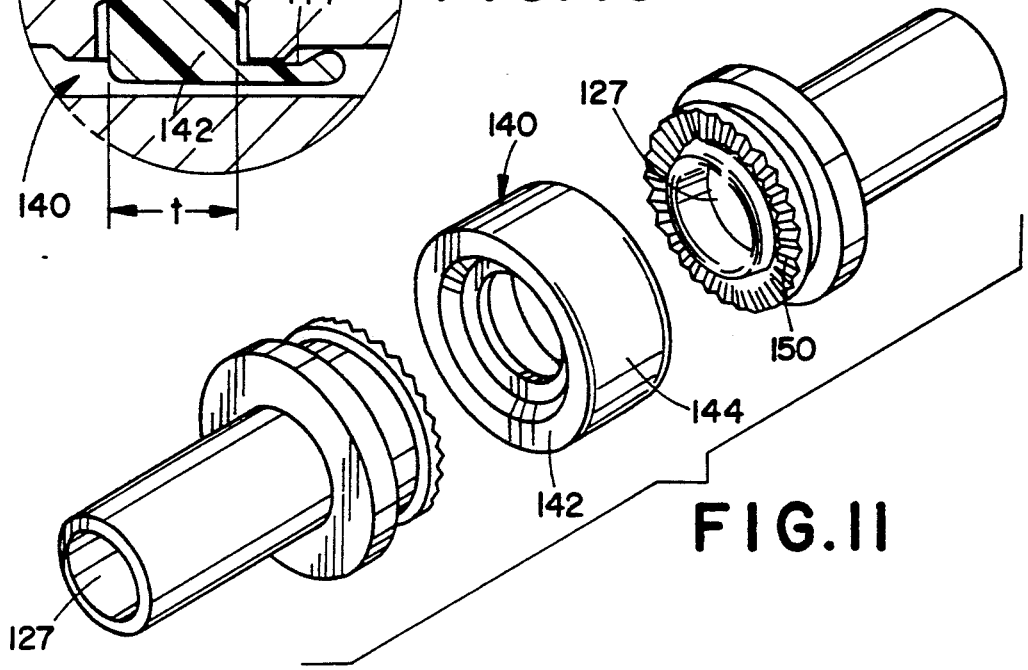

TUBE COUPLING WITH GASKET RETAINER

BACKGROUND OF THE INVENTION

The subject invention is directed toward the art of pipe joints and couplings and, more particularly, to an improved tube coupling. The coupling is especially suited for use in ultra-high vacuum applications and will be described with particular reference thereto; however, as will become apparent, the invention is capable of broader application and could be used in any environment under a variety of pressure conditions.

In U.S. Pat. No. 3,521,910 to Callahan, et al., there is disclosed a tube coupling which has achieved substantial commercial success and is used in both pressure and vacuum applications. It is, however, particularly suitable for ultra-high vacuum applications.

The coupling of the noted patent generally comprises first and second annular coupling components having axial through passages and end faces which extend perpendicular to the axis of the passages. An annular rib, generally of hemispherical cross-section, extends outwardly from each end face about the through passage. A smooth, flat, annular metal sealing gasket is trapped between the opposed end faces and a threaded coupling nut or nuts act to drive the coupling components toward each other to produce sealing engagement of the annular ribs with opposite sides of the annular sealing gasket.

In making up the coupling, it is highly preferable to minimize relative rotation between the coupling components and the sealing washer. The reason for this is that the relative rotary motion can produce undesirable scoring or the like on the sealing washer and/or the sealing end faces of the coupling components. This can reduce the effectiveness of the joint and leaks may sometimes result. Additionally, when torque is transmitted from the coupling nuts to the coupling components, there is a corresponding transmission to system components and tubing which is connected to the coupling components. This can produce misalignment, twisting, and sometimes even results in damage to the related system components.

In an effort to prevent the relative rotation and reduce torque transmission from the coupling nut to other system components, it has been proposed to install anti-friction thrust bearings between the coupling nut and the associated coupling component. Both standard and special ball and needle type bearing assemblies have been proposed. Although this approach generally works satisfactorily it is somewhat undesirable in that it increases the cost and complexity of the coupling assemblies. Moreover, the addition of the anti-friction thrust bearing can significantly increase the overall length of the coupling assembly. Accordingly, there exists an ongoing need for a design to prevent relative rotary movement between the sealing faces of the coupling components and/or between the coupling components and the seal ring during coupling makeup.

BRIEF DESCRIPTION OF THE INVENTION

The subject invention provides a coupling structure which overcomes the noted problem in an extremely efficient and economical manner. In particular, and in accordance with one aspect of the invention, a coupling assembly of the type described is provided with anti-torque means that engage with the end faces of the coupling components prior to engagement of the end faces with each other or with the seal ring, if a seal ring is used. The engagement is such as to produce a somewhat positive connection, such as by producing frictional forces between the coupling components, or between the coupling components and the seal ring, sufficient to prevent relative rotation therebetween and to reduce the possibility of twisting or torquing the coupling components during tightening of the coupling nuts.

In accordance with one embodiment, the means that produce the connection and engage with the end faces of the coupling components are protrusions formed on the sealing gasket at locations radially outwardly of the circumferential ribs. The protrusions have a radial height greater than the radial height of the ribs so that they must engage the end faces of the coupling components prior to engagement of the ribs with the sealing gasket.

In accordance with another embodiment, the means that produce the connection can comprise an anti-torque member carried between the end faces and engaged with teeth or knurls formed in the outer peripheral portions of the end faces at circumferentially spaced locations. The teeth or knurls preferably extend from both end faces and engage the drive member to produce significant frictional engagement prior to achieving sealing engagement between the end faces or an associated gasket.

According to a further aspect of the invention, a bearing washer of a high lubricity resinous material can be mounted between the coupling nut and the associated coupling component to thereby reduce the amount of torque that can be transmitted between the nut and the coupling component during make-up.

Preferably, the bearing washer is extremely thin so that the cold flow of the washer after make-up is minimized to thereby minimize loss of axial engagement forces between the annular ribs and the sealing washer.

In accordance with another and more limited aspect of the invention, the annular ribs on the end faces of the coupling components are located as close as possible to the circumference of the through passage. In addition, the ribs themselves are of reduced cross-section. This significantly reduces the axial forces required to produce sealing engagement with the gasket; and, consequently, results in a reduction in the forces tending to produce relative rotation between the coupling components, the gasket, and associated system components.

As is apparent from the foregoing, a primary object of the subject invention is the provision of a coupling of the type described which eliminates relative rotational movement between the coupling components' sealing surfaces during make-up and reduces or eliminates torque transmission to related system components.

Another object is the provision of a coupling wherein the drive means is provided with means to produce driving engagement between the cooperating coupling components prior to achieving sealing engagement.

Yet another object is the provision of a sealing gasket for use in couplings of the type described which includes means for eliminating relative rotational movement between coupling components during make-up as well as torque transmission from the coupling nuts to the coupling components and related system components.

A further object is the provision of a coupling of the type under consideration which has a design that results in a reduction in the axial forces required to produce sealing between the sealing gasket and the annular ribs.

BRIEF DESCRIPTION OF THE DRAWINGS

The above and other objects and advantages will become apparent from the following description when read in conjunction with the accompanying drawings wherein:

FIG. 5 is an exploded cross-sectional view showing the various components of the coupling assembly;

FIG. 6 is a plan view of the sealing rings or gasket used in the coupling assembly;

FIG. 7 is a side elevational view of the sealing gasket retainer member;

FIG. 8 is the view taken on line 8—8 of FIG. 7.

FIG. 9 is a longitudinal cross-section through a second embodiment of the invention;

FIG. 10 is an enlarged view of the circled area of FIG. 9; and,

FIG. 11 is an exploded pictorial view of the main coupling components and the drive member used in the FIG. 9 embodiment.

DETAILED DESCRIPTION OF PREFERRED AND ALTERNATE EMBODIMENTS

Figure 1:
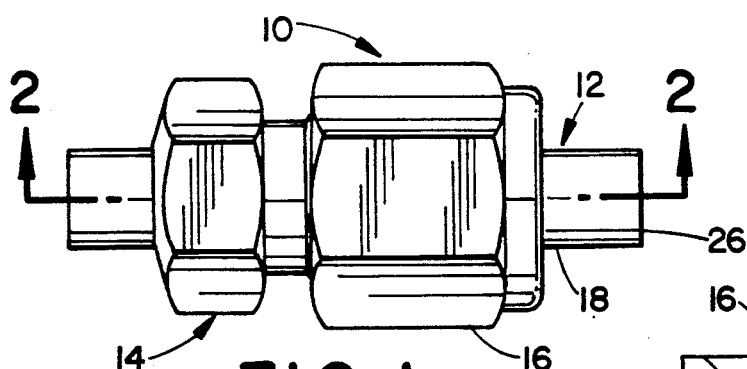
FIG. 1 is a side view of a coupling assembly formed in accordance with a preferred embodiment of the subject invention.
Figure 2:
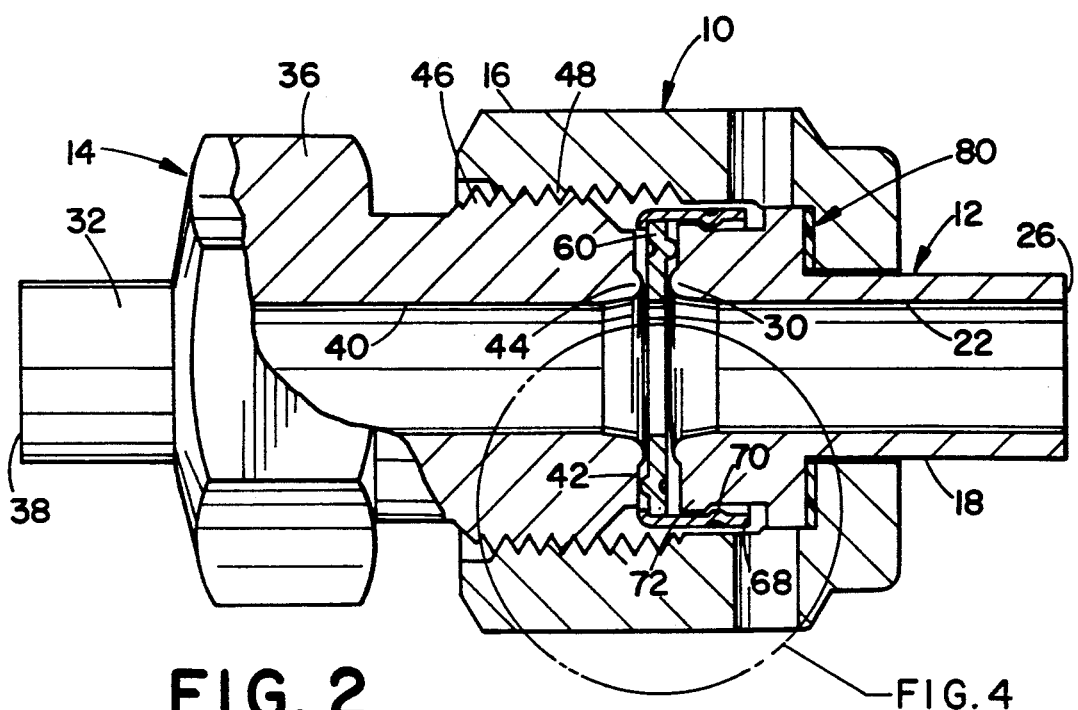
FIG. 2 is a partial cross-sectional view taken on line 2—2 of FIG. 1 and showing the coupling components in a partially assembled condition.

Referring more particularly to the drawings wherein the showings are for the purpose of illustrating a preferred embodiment of the invention only, and not for the purpose of limiting same, FIGS. 1 and 2 best illustrate the overall arrangement of a coupling assembly 10 formed in accordance with the preferred embodiment of the invention and generally comprising a first coupling component 12 and a second coupling component 14. The first and second coupling components 12 and 14 are joined by a coupling nut 16 in a manner subsequently to be described.

As best shown in FIGS. 2 and 5, the first coupling component 12 includes first and second cylindrical sections 18 and 20 with a central axially extending through passage 22. The first coupling component 12 terminates in first and second end faces 24 and 26 respectively. Each of the first and second end faces 24 and 26 are generally perpendicular to the axis of through passage 22. Second end face 26 is adapted to be connected to associated fluid flow vacuum lines or the like. In the subject embodiment, second end face 26 is intended to be butt welded to the associated lines. It should, of course, be understood that many types of end fittings or connectors could be used.

First end face 24 of the first coupling component 12 is the sealing face and is provided with a circumferentially extending raised rib or bead 30 which is positioned relatively closely adjacent the outer circumference of the through passage 22. The rib 30 is circumferentially continuous and can have a variety of cross-sectional shapes. As will subsequently be described more fully, it is shown as having a generally hemispherical cross-sectional configuration and is preferably highly polished.

The second coupling component 14 is illustrated as including a pair of generally cylindrical body sections 32 and 34 having an intermediate hexagonal body section 36. The second end face 38, like second end face 26 of first coupling component 12, is intended to be butt welded to associated fluid lines or vacuum lines and is perpendicular to a central passageway 40 which extends axially through the second coupling component 14. The first end face 42 is the sealing face and is generally perpendicular to the axis of central passageway 40 and includes a raised annular rib or bead 44 which extends closely about the central passageway 40. Rib 44 preferably has a configuration and arrangement corresponding to the previously mentioned raised rib 30. In addition, the rib 44 is preferably located at the same radius from the axis of the through passage as is rib 30.

The cylindrical body section 34 of second coupling component 14 is provided with suitable threads 46 which extend inwardly from the first end face 42. The threads 46 are arranged to cooperate with and threadedly receive the internal threads 48 of the coupling nut 16. Referring more particularly to coupling nut 16 as illustrated in FIGS. 2 an 5, it will be noted that the coupling nut 16 has a generally hexagonal outer configuration and an axially extending central passage 50. The central passage 50 is provided with a first cylindrical section 52 which is sized to relatively closely but freely receive the first cylindrical section 18 of first coupling component 12. The left hand section 54 of central passage 50 is sized so as to be capable of freely receiving the flanged portion 21 of the second cylindrical section 20 of first coupling component 12. In addition, an internal shoulder 56 extends circumferentially about the first cylindrical section 52 and lies perpendicular to the central axis of coupling nut 16. A similar radially extending shoulder 58 is formed on first coupling component 12 and likewise lies perpendicular to the central axis of the first coupling component 12. As can be appreciated, coupling nut 16 can be threadedly received on the second coupling component 14 with the first coupling component 12 located as shown in FIG. 2. Tightening of the coupling nut 16 causes the first and second coupling components 12 and 14 to be driven toward one another into sealing relationship with a suitable sealing gasket member 60. The sealing gasket member 60 is arranged to be held in centered position relative to the first end face 24 of first coupling component 12 by a retainer member indicated generally with the numeral 64.

Figure 4:
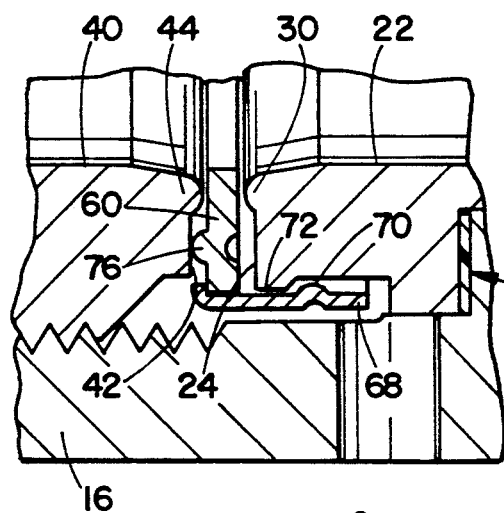
FIG. 4 is an enlarged view of the circled area of FIG. 2.
Figure 3:
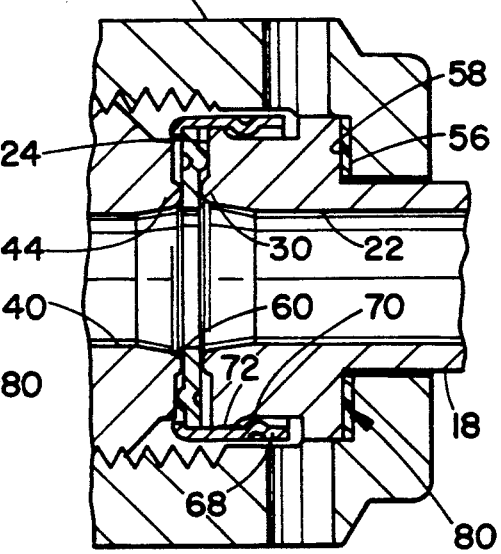
FIG. 3 is a partial view similar to FIG. 2 but showing the coupling components in their fully assembled and sealed condition.

The retainer member 64 is formed as best shown in FIGS. 7 and 8 and comprises a somewhat cup-shaped stamped metal body 66 having three resilient retainer legs 68 which are integral therewith. The cup-shaped metal body 66 is sized so as to closely but freely receive the outer periphery of the sealing gasket member 60 in the manner shown in FIGS. 2 through 4. The resilient retainer legs 68 are sized so as to receive the first coupling component 12 in the manner shown. Adjacent the ends of each of the retainer legs 68 is a protuberance or bead member 70 which is adapted to engage over the small flange 72 formed on the end of the first coupling component 12. The design of such retainers and their purpose is well known in the art. Broadly, however, they act to maintain the gasket properly located relative to the annular ribs 30, 44 and to allow the gasket position to be retained during disassembly and remaking of the coupling assembly.

The coupling assembly thus far described is in its broad aspects generally well known and in widespread use, especially in high vacuum systems. As can be appreciated, by tightening the coupling nut 16 while holding the hexagonal portion of the second coupling component 14, the first end faces 24 and 42 of the first and second coupling components 12 and 14 are driven toward each other into sealing engagement with opposite faces of the flat metal sealing gasket member 60. As discussed in the introductory portion of the specification, one problem which has been encountered with this particular type of coupling assembly is that during make-up, the coupling nut 16 can sometimes transmit torque through the first coupling component 12 thereby producing relative rotary movement between the first and second coupling components 12 and 14 and the sealing gasket member 60. This rotary movement can produce undesirable scoring or galling of the sealing gasket member 60 and increase the likelihood that leakage will result. Moreover, torque applied to the coupling components can result in application of undesirable application of torque to related system components connected to the coupling. In an effort to overcome this torque transmission and relative rotary movement, it has been proposed to install anti-friction type ball or needle bearings between the coupling nut 16 and the first coupling component 12. More particularly, the anti-friction bearings have been installed in the space between the opposed shoulders 56, 58. While this approach has worked satisfactorily, it significantly increases the cost, complexity, and overall length of the coupling assembly. Accordingly, it has been considered highly desirable to achieve these desired ends without using anti-friction type bearings. The subject invention achieves these ends through a combination of features which can be used in the solution of the noted problem. In particular, referring to FIGS. 4 and 5, it will be noted that the annular rib or beads 30 of the subject device are located adjacent the outer wall of through passage 22 and central passageway 40, respectively. That is, in each of the first and second coupling components 12 and 14, the associated rib or bead is arranged so that it has the minimum possible radius from the center axis or, in other words, is located as close to the passageway as possible. In addition, when compared with similar prior coupling assemblies, the size of the ribs themselves have been made with a significantly smaller cross-section to increase the ease with which they can penetrate the faces of the sealing gasket member 60. The combination of the reduced diameter of the ribs as well as their reduced cross-sectional size reduces the axial force which must be applied to the coupling components to produce the desired penetration and sealing relationship with the gasket. This significantly reduces the torque which must be applied to the assembly by the coupling nut 16. The reduced torque, of course, reduces the possibility that relative rotary motion will be induced in or between the coupling components and the sealing gasket member 60.

More importantly, however, the subject arrangement provides anti-torque means for producing a high level of positive engagement between the first and second coupling components 12 and 14, and sealing gasket member 60, during make-up and prior to the time that actual engagement takes place between the annular ribs 30, 44 and the sealing gasket member 60. The means could take many forms but, in the subject embodiment, it comprises protrusions which extend outwardly from the opposed faces of the sealing gasket member 60 to allow it to produce frictional engagement between the first end faces 24 and 42 radially outwardly of the associated bead 30, 44. More particularly, referring to FIGS. 4 and 6, it will be seen that the annular sealing gasket member 60 includes a plurality of protrusions or beads 76 which are located at spaced locations circumferentially about the outer peripheral edge of the sealing gasket member 60. The subject embodiment uses four of the protrusions or beads 76 extending from each of the opposed faces of the gasket as best shown in FIG. 6. Note that the beads 76 are spaced approximately 90° apart on each side and the set on one side is offset an angle of 45° from the set on the opposite side. In addition, it should be noted from FIG. 4 that the axial height of the beads 76 is such that during make-up the beads 76 engage the associated end face 24, 42 prior to engagement of the beads 30, 44 with the sealing portion of the sealing gasket member 60. This engagement by the beads 76 with the first and second coupling components 12 and 14 produces a frictional driving connection between the two components to substantially reduce or eliminate the possibility of relative motion between these two components and the associated sealing gasket member 60. The force with which the frictional engagement takes place can be increased by many techniques, for example, by knurling or roughening the outer peripheral portions of the first end faces 24, 42. This particular arrangement for preventing relative rotation and undesirable scoring or working of the sealing gasket member 60 does not require any change in the overall length or complexity of the assembly. In addition, the changes do not significantly affect the cost or manufacturing problems associated with the assembly.

To further reduce and/or eliminate the possibility of torque transmission from the coupling nut 16 to the first coupling component 12, the subject embodiment further incorporates a bearing ring 80 between the opposed shoulders 56,58. The bearing ring 80 is preferably extremely thin and is formed from a plastic resinous material having extremely high lubricity. One material which has been found to be suitable for this use is graphite filled polyetheretherketone. In addition, the ring is sized so as to substantially fill the radial gap or space between the two opposed shoulders 56, 58. Moreover, the thickness of the bearing ring 80 is preferably something in the range of 9 or 10 thousandths of an inch. By keeping the total mass of material extremely small, advantage can be taken of the material's high lubricity properties to reduce the transmission of torque from the coupling nut 16 to the first coupling component 12. Simultaneously, however, the small amount of the material which is present between the surfaces reduces any adverse results which might result from cold flowing of the material after joint make-up. That is, if the material were to undergo significant cold flow and move from its trapped position in the cavity a reduction of the sealing force on the gasket could take place.

FIGS. 9–11 illustrate a second embodiment of the subject invention. As shown therein, the coupling assembly 100 generally comprises a first coupling component 112 mounted in aligned and mating relationship with second coupling component 114. First and second coupling components 112 and 114 are joined by cooperating coupling nut means comprising a first coupling nut member 116 and a second coupling nut member 118.

In this embodiment, each of the coupling components 112 and 114 are substantially identical and, accordingly, only first coupling component 112 will be described in detail. Specifically, first coupling component 112 includes a reduced diameter cylindrical section 120 which joins a radially extending end portion 122 which carries a flange 112a and terminates in an end face 124 which carries the sealing protrusion. A central through passage 127 extends axially through reduced diameter cylindrical section 120 and end portion 122. The first coupling component 112 is, in the subject embodiment, arranged to be butt welded to an associated flow line or the like. It could, however, obviously be joined using other well known tubing connectors.

As mentioned, the second coupling component 114 is substantially identical to first coupling component 112 and includes a radially extending end portion 126 which carries a flange 126a is integral with a reduced diameter cylindrical section 128. Section 126 terminates in an end face 130 with a sealing protrusion. A through passage 132 extends axially between the opposed ends of second coupling component 114. First and second coupling components 112 and 114 are maintained in an aligned, sealed relationship by the first and second coupling nut members 116 and 118. First coupling nut member 116 is provided with an inwardly extending cylindrical opening 136 which is sized so as to freely receive the flanged end portions 122, 126 of the respective coupling components 112 and 114. A circular through opening 138 extends axially of the first coupling nut member 116 to closely receive the reduced diameter cylindrical section 120 of first coupling component 112.

Second coupling nut member 118 is arranged to be received over the reduced diameter end portion 128 of second coupling component 114. First and second coupling nut members 116 and 118 are threadedly connected through cooperating threads 141 and 143, respectively.

As can be readily seen, tightening of the first and second coupling nut members 116, 118 acts to drive the end faces 124 and 130 of the first and second coupling components 112 and 114 together. To allow such tightening to be accomplished, the exterior of the first and second coupling nut members 116 and 118 preferably include wrench flats as previously described with reference to the FIGS. 1-8 embodiment.

Important to the subject invention is the arrangement whereby a connection is provided between the end faces 124, 130 of the mating first and second coupling components 112 and 114 to prevent relative rotation therebetween. In the subject embodiment, this connection is provided by an annular anti-torque member 140 which is formed from a relatively rigid plastic material which has sufficient resiliency to allow it to undergo some compression when engaged by the opposed end faces of the first and second coupling components 112 and 114. As best illustrated in FIGS. 10 and 11, the member 140 has an annular body section 142 and an axially extending integral flange or rib 144. The rib 144 is sized so as to allow it to engage circumferentially about the enlarged end section of the associated coupling member to hold the body section 142 in position. Although the member is shown as connected to end section 126 of second coupling component 114, it could obviously be connected to first coupling component 112. The axial thickness t of the annular body section 142 (see FIG. 10) is such that the end faces of the first and second coupling components 112 and 114 engage the anti-torque member prior to sealing engagement taking place between the end faces and the associated gasket 125. Thus, as the coupling nut members 116, 118 are tightened to draw the first and second coupling components 112 and 114 toward one another, a positive engagement with the member 140 takes place. It should be noted that the member 140 is also sized so that it can engage about the outer periphery of the gasket member to hold it properly centered relative to the end faces 124, 130.

In order to increase the driving engagement between the respective end faces and the member 140, the end faces 124, 130 are provided with small teeth or knurling as best shown in FIG. 11. As shown therein, the end face of each of the first and second coupling components 112 and 114 are provided with small knurls or teeth 150 which extend axially from the end face circumferentally about the sealing beads. These teeth or knurls 150 engage with and deform the member 140 to produce a positive engagement as the first and second coupling components 112 and 114 are driven together. It should be appreciated that corresponding mating teeth could be molded in the sides of the member 140 if desired.

Thrust washer 154 is positioned between the components 112, 114 in the manner of previously discussed washer 80. Here again, the washer is preferably formed of graphite filled polyetheretherketone. The presence of the washer 154 reduces the possibility of transmitting torque to components 112, 114 during make-up of the fitting.

As is apparent from the foregoing, the subject invention allows the coupling assembly to maintain its original simplicity while overcoming the noted problems.

Obviously, modifications and alterations of the preferred embodiment will occur to others upon a reading and understanding of the subject specification. It is, accordingly, intended to include all such modifications and alterations as part of the invention insofar as they come within the scope of the appended claims.

What is claimed is:

1. A coupling comprising:
    first and second annular coupling components each having an axis and first and second ends, said first ends each including an end face disposed generally transverse to said axis and defining a seal surface;
    said first and second annular coupling components being positioned with said end faces and said seal surfaces in aligned face-to-face relationship;
    first and second annular coupling nut means for causing said seal surfaces of said first and second annular coupling components to be driven toward each other; and,
    means extending axially outwardly in both directions beyond said seal surface for engaging said first and second annular coupling components and producing driving engagement between said first and second annular coupling components as said seal surfaces are driven toward one another to prevent relative rotational movement between said sealing surfaces as said first and second annular coupling nut means acts to drive said first and second annular coupling components toward each other, said means comprising an annular sealing gasket having opposed sealing faces and a plurality of circumferentially spaced protrusions extending axially outwardly from both said opposed sealing faces for frictionally engaging said end faces radially outwardly of said seal surfaces.

2. The coupling as defined in claim 1 including a bearing member between said coupling nut means and said second annular coupling component to reduce the transfer of torque from said coupling nut means to said second annular coupling component.

3. The coupling as defined in claim 2 wherein said bearing member comprises a thin piece of resinous material having high lubricity.

4. The coupling as defined in claim 5 wherein said sealing surfaces are raised ribs.

5. A coupling comprising:
   first and second annular coupling components each having an axis and first and second ends, said first ends each including an end face disposed generally transverse to said axis and defining a seal surface;
   said first and second annular coupling components being positioned with said end faces and said seal surfaces in aligned face-to-face relationship;
   first and second annular coupling nut means for causing said seal surfaces of said first and second annular coupling components to be driven toward each other; and,
   means extending axially outwardly in both directions beyond said seal surfaces for engaging said first and second annular coupling components and producing driving engagement between said first and second annular coupling components as said seal surfaces are driven toward one another to prevent relative rotational movement between said sealing surfaces as said first and second annular coupling nut means acts to drive said first and second annular coupling components toward each other, said means including a plurality of protrusions extending axially outwardly for engaging said first and second annular coupling components at locations radially outwardly of said sealing surfaces prior to engagement of said sealing surfaces.

6. The coupling as defined in claim 4 including a gasket having sealing surfaces located radially inwardly of said protrusions.

7. A sealing gasket for use between mating coupling components of a type including aligned end faces positioned in opposed relationship and having axially extending annular ribs which are adapted to engage directly opposite one another on opposite sides of said sealing gasket, said sealing gasket comprising:
   a relatively rigid metal body having a flat annular configuration having a circular outer peripheral area and a circular inner peripheral area located about a central opening, said circular inner peripheral area constituting a seal surface and being smooth and flat and having a radial extent greater than the radial extent of said annular ribs for engagement therewith; and,
   a plurality of oppositely directed protrusions extending axially outwardly from said rigid metal body in the circular outer peripheral area radially outwardly of the seal surface, total axial extent of said protrusions being greater than an axial extent of said annular ribs so that engagement of said annular ribs with said sealing gasket cannot take place until after said protrusions have engaged said coupling components.

8. The sealing gasket as defined in claim 7 wherein said protrusions comprise a plurality of circumferentially spaced beads extending outwardly from opposite faces of said sealing gasket.

9. A coupling comprising:
   first and second annular coupling components each having an axis and first and second ends, said first ends each having an annular end face disposed generally transverse to the axis and defining a sealing surface extending generally about the inner periphery thereof;
   said first and second annular coupling components being positioned with said end faces and said sealing surfaces in aligned and opposed face-to-face relationship;
   a threaded coupling nut surrounding one of said coupling components and threadedly connected such that tightening of said coupling nut causes said annular end faces of said first and second annular coupling components to be driven toward each other;
   an annular anti-torque member having oppositely facing surfaces positioned between said annular end faces for engagement with said annular end faces as said annular end faces are driven toward each other, said annular anti-torque member including means comprising circumferentially spaced protrusions extending axially outwardly from each of said oppositely facing surfaces and located radially and axially outwardly of said sealing surfaces for engaging said annular end faces prior to sealing engagement by said sealing surfaces to prevent relative rotational movement between said sealing surfaces during tightening of said coupling nut.

10. The coupling as defined in claim 9 wherein said protrusions are spaced circumferentially on a sealing gasket located between said first and second annular coupling components and wherein said protrusions frictionally engage said annular end faces during tightening of said coupling nut means.

11. The coupling as defined in claim 10 including a retainer member for maintaining said sealing gasket located relative to said annular end faces during tightening of said coupling nut means.

12. The coupling as defined in claim 11 including bearing means between said coupling nut means and the coupling component which it surrounds for reducing the transmission of torque therebetween.

13. The coupling as defined in claim 9 wherein said means further comprises an annular body engaged between said annular end faces radially outwardly of said sealing surfaces.

14. The coupling as defined in claim 13 wherein said annular body is releasably connected to one of said annular coupling components.

15. The coupling as defined in claim 13 wherein said annular body supports a sealing gasket in aligned relationship with said sealing surfaces.

16. The coupling as defined in claim 13 wherein said annular body is formed from a resinous plastic material.

17. The coupling as defined in claim 13 wherein said annular body includes means for supporting a gasket aligned with said sealing surfaces.

18. A coupling comprising:
   first and second annular coupling components each having an axis and first and second ends, said first ends each having an annular end face disposed generally transverse to the axis and defining a sealing surface extending generally about the inner periphery thereof;

said first and second annular coupling components being positioned with said end faces and said sealing surfaces in aligned and opposed face-to-face relationship;

a threaded coupling nut means surrounding one of said coupling components and threadedly connected such that tightening of said coupling nut means causes said annular end faces of said first and second annular coupling components to be driven toward each other;

an annular anti-torque member having oppositely facing surfaces positioned between said annular end faces for engagement with said annular end faces as said annular end faces are driven toward each other, said annular anti-torque member including means extending from each of said oppositely facing surfaces and located radially and axially outwardly of said sealing surfaces for engaging said annular end faces prior to sealing engagement by said sealing surfaces to prevent relative rotational movement between said sealing surfaces during tightening of said coupling nut means; and, said annular anti-torque member further comprising a sealing gasket having protrusions for frictionally engaging the annular end faces of said first and second annular coupling components.

* * * * *